O. G. SIMMONS.
BOLL COTTON SEPARATOR AND CLEANER.
APPLICATION FILED AUG. 13, 1918.

1,310,304.

Patented July 15, 1919.
4 SHEETS—SHEET 1.

INVENTOR:
Oliver G. Simmons.

O. G. SIMMONS.
BOLL COTTON SEPARATOR AND CLEANER.
APPLICATION FILED AUG. 13, 1918.

1,310,304.

Patented July 15, 1919.
4 SHEETS—SHEET 4.

INVENTOR:
Olvin G. Simmons.

UNITED STATES PATENT OFFICE.

OLIVER G. SIMMONS, OF SAN ANTONIO, TEXAS.

BOLL-COTTON SEPARATOR AND CLEANER.

1,310,304.   Specification of Letters Patent.   Patented July 15, 1919.

Application filed August 13, 1918. Serial No. 249,632.

*To all whom it may concern:*

Be it known that I, OLIVER G. SIMMONS, a citizen of the United States, residing at San Antonio, in the county of Bexar and State of Texas, have invented a new and useful Boll-Cotton Separator and Cleaner, of which the following is a specification.

My invention relates to boll cotton separator and cleaner, the same residing particularly in the means for separating and cleaning boll, hully or trashy cotton prior to its entry into the gin or for other purposes of an analogous nature, the general object of which is to provide novel, simple and effective means whereby the cotton is maintained in its natural staple, equivalent to hand picked cotton from open bolls.

The detailed objects of my invention are, to provide in a cotton separator and cleaner, the means to catch the cotton delivered to the separating chamber; means to remove said cotton from said catching means; means to adjust the catching means with respect to members supporting same and with respect to cotton picking means; and, supplemental cleaning means adjacent the picker saw cylinder and the kicker cylinder.

Other details of the invention will hereinafter appear, and the novel features thereof will be set forth in the claims.

One embodiment of my invention is disclosed in the accompanying drawings, wherein.

Like reference numerals designate the same parts throughout the specification.

Figure 1:
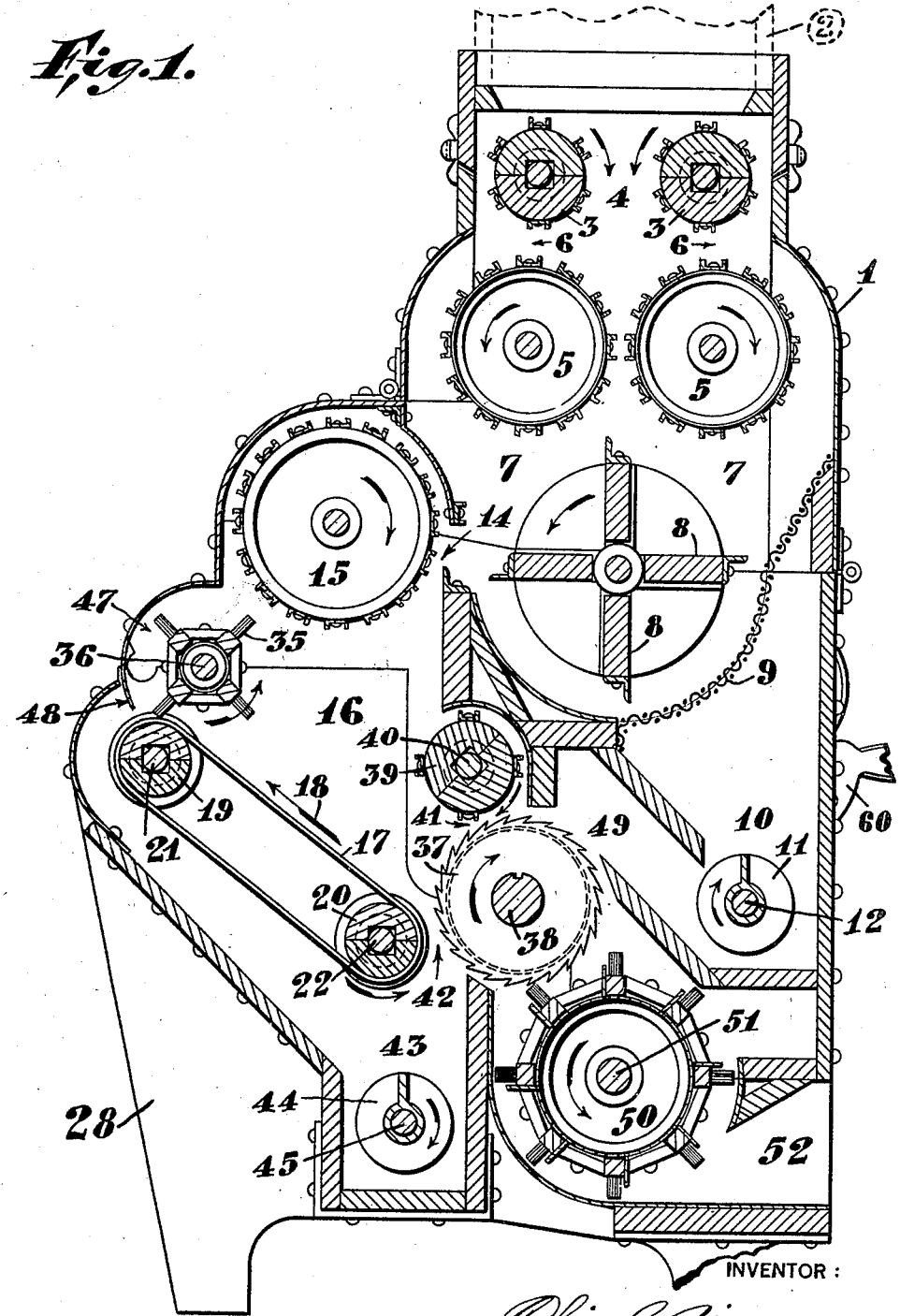
Figure 1 is a central vertical section of the entire boll cotton separator and cleaner.

The numeral 1 indicates the casing of the machine in which, to the upper portion thereof, I prefer to attach the hopper 2, shown in dotted lines, the other end of which connects with the cotton conveying distributer (not shown) and which forms a part of the installation or structure of gin houses.

To feed the cotton I prefer to employ a series of plural members, and preferably to rotate them so that the peripheral velocity of which members will be different in a series whereby, in addition to feeding the cotton from the hopper to the machine, they will also serve as the means to squeeze and crack, by a crushing force, all unopened bolls of cotton and which action, due to the slow speed of the movement, will not disturb, mix, or permeate the cotton to a greater degree with pulverized trash than the state in which said cotton was received.

By cotton I mean the general run of same, the hand picked free from bolls and hulls, the bolly kind opened and unopened, in other words, the general run of cotton unloaded by planters during a season at the gin.

A peculiar property of the cotton plant is that on the same bush opened and unopened bolls of cotton are to be found and when the plant is killed by drought, in some States, and by frost in other States, and sometimes by both in the same State, in different localities, the planter usually snaps the crop, *i. e.*, picks all by snapping the boll from the stem. Thus in bolly cotton, there is opened and unopened bolls of cotton.

Heretofore in cotton machines of this character, no attempt so far as I am aware, has been made to subject the boll cotton to any other treatment than the action of the striking blades of a paddle. In such machines, and notwithstanding attempts at feed and other regulating devices, it is obvious that the reduction of the hard unopened bolls of cotton would necessarily be slower than bolls partially opened with extruding cotton, or bolls broken into segments prior to their entry into contact with the beater arms of said paddle wheel. With such devices, constant attention is necessary to prevent choking of the mass, due to the ununiformity of the reduction of same, which ununiformity causes the mixing of the cotton with fractured hulls, small particles of hulls that have been partially pulverized, boll filaments, pulverized leaves and small broken pieces of the stem of the plant. The constant attention referred to, is costly in labor, unsatisfactory and results in reduced output and in the quality of the cotton so treated.

Other similar attempts have been made to overcome the objections above stated, by means of exterior boll breakers, in some instances by placing a highly rotating paddle wheel, or cylinder, provided with beater arms, similar to the devices previously referred to, in the form of a paddle, in the cotton conveyer pipe line, passing all cotton mass through the said breakers. This also has proven unsatisfactory, for the same reasons above stated, in which the mass tends to choke up and becomes further permeated with trash, as will result from all methods of breaking unopened bolls of cotton in the presence of opened bolls, by the means of impact with the highly rotating beater arms of a cylinder or paddle wheel.

To overcome the above objections, I have provided novel, simple and effective means forming the subject matter of a companion application for Letters Patent filed of even date hereto, in which I disclosed the means whereby the boll cotton mass is subjected to the squeezing crushing action of a series of plural members rotating at different peripheral velocities, by means of which, the unopened bolls are cracked into clinging segments, and the mass, thus in a uniform condition, is delivered by means of the feeding action of said members to a reduction chamber, where the whole is reduced into separate segments and expelled from same to a separating chamber, there to be further acted upon as will hereinafter appear.

Figure 2:
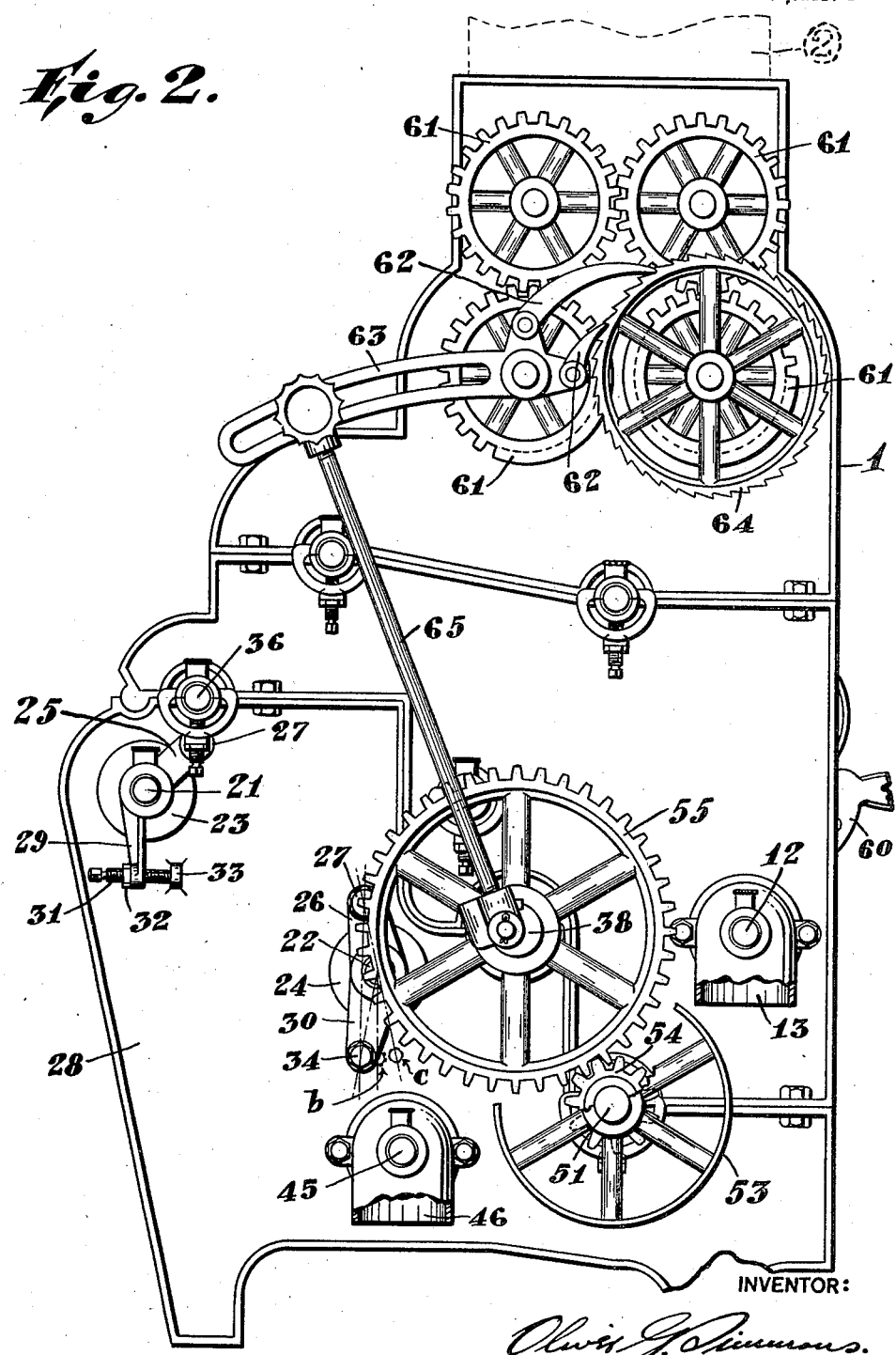
Fig. 2 is an end elevation of the right side of the machine viewed from the same position as the central section of Fig. 1.

Suffice it to say, therefore, in the present case, the cotton mass by means of gravity, falls through the hopper 2 and into contact with the slowly rotating members 3, passing through the space 4 into contact with the members 5, through the restricted space 6 and thence into the reduction chamber 7, as described in the companion application referred to, where the said mass is subjected to the whirling action of beater arms 8, which action beats the mass into free natural segments and into contact with the screen 9, whereupon, due to the centrifugal force of the whirling action of said beater arms, the sand, dirt and trash is forced through said screen and into the trash chamber 10, to the lower portion of which I have provided the rotary conveyer 11, secured to the shaft 12, by means of which conveyer the trash is carried out of said trash chamber through the spout 13, Fig. 2, which is adapted to be fastened to a suction pipe to carry said trash out of the gin house.

During the whirling action above referred to, the cotton will be thrown against the restricted opening 14, and if reduced sufficiently will enter said opening and contact with the rotating sorter cylinder 15, to be carried through said opening into a separating chamber 16. If the cotton mass, however, has not been reduced sufficiently, so as to enter the said restricted opening, the same will be thrown back into contact with the beater arms 8, for further reduction, and which will later, by the means described, find its way into said separating chamber.

The cotton as delivered to the separating chamber aforesaid is usually in the form of free cotton puffs adhering closely to the cotton seed, cotton puffs with clinging free boll segments, and boll segments containing immature cotton; the whole more or less contaminated with large pieces of the stem of the cotton plant, which could not be expelled from the cotton mass while in the reduction chamber owing to their size, the same being unable to pass through the screen except lengthwise, which is a condition not likely to prevail over a given period.

For the purpose, therefore, of separating the cotton, I prefer to agitate same constantly in the separating chamber and to pick said cotton from said chamber in such way as to deliver same in substantially an uncontaminated condition, with the minimum of loss, and at the same time to discharge the hulls, stems of the plant and other trash carried into the separating chamber. To accomplish this I preferably provide within the separating chamber the cotton lint picker belt 17, to catch the cotton entering and whirling about in the separating chamber, which belt may be made of any suitable material, preferably of woven fabric or of felt, the same being adapted to move in the direction indicated by the arrow 18, by means of the supporting members in the form of rollers or pulleys 19 and 20, which are secured to their respective shafts 21 and 22, which shafts are journaled in adjustable bracket members 23 and 24 respectively, see Fig. 2 and Fig. 3, the extensions of the upper ends 25 and 26, of which members, are adapted to be journaled on a bolt 27 having threaded engagement with the lower frame member 28. Thus the bracket members 23 and 24 are adapted to swing on the said bolt 27, so that if said brackets are provided with additional extensions 29 and 30, means could be provided in these extensions to secure the said brackets in adjustable position, and the shafts 21 and 22 in adjustable position with respect to each other, or with respect to other members of the apparatus. For a purpose, therefore, which I will describe later, I have provided the extensions 29 and 30 with means to secure the said brackets in the desired position, e, g., by means of the set-screw 31 and the check-nut 32, in the lower portion of the extension 29, the set-screw of which is adapted to impinge against the lug 33, which is an integral part of the lower frame member 28. In somewhat similar way, the extension 30, of the bracket 24, is provided with a bolt 34, adapted to have threaded engagement with one of a series of holes, $a$, $b$ and $c$ in the frame 28, as shown in Figs. 2, 3, 4 and 5. It is now obvious that the lint belt rolls 19 and 20, Fig. 1, may be adjusted either with respect to themselves, or to some other members of the apparatus, and further obvious that when the cotton enters the separating chamber 16, after passing through the restricted opening 14, it will have considerable velocity due to the centrifugal force of the periphery of the sorter cylinder 15, with which said cotton is in contact during said passage; and, as said cotton in the said separating chamber will eventually adhere to the lint picker belt 17, means will have to be provided within the said separating chamber to remove the said cotton from the said lint picked belt, and preferably, in such manner as to cause same to be thrown against additional means partially entering the said separating chamber, for the purpose of picking and conveying the cotton out of the said separating chamber. To accomplish all these things I prefer the means which I will now describe.

Contained within the separating chamber 16, above the lint belt 17, and in contact therewith, I provide the lint brush indicated generally by the numeral 35, and which is adapted to be rotated on the shaft 36. To the lower portion of the lint belt, adjacent the roll 20, I preferably provide the cotton picker saws indicated generally by the numeral 37, sixty to one-hundred of which usually make up a saw cylinder, and which saws are adapted to rotate with the saw shaft 38. Above the picker saws and to one side thereof, I prefer to mount a kicker cylinder 39, on the shaft 40, in a cavity or pocket of the machine, adapting said cylinder to rotate with said shaft in said cavity.

The means for driving the respective shafts in the directions indicated by the arrows, will be described later, for the present, therefore, let us assume that the members within the separating chamber 16, are moving as indicated.

The cotton mass, on entering the separating chamber, will be thrown against the lint belt which will catch said cotton or which will cause same to rebound. In the former event, the cotton will be carried up to and in contact with the rotary lint brush whereupon, said brush will brush with a rotary movement all cotton from the lint belt, either to and against the picker saws, or against the kicker roller, in either of these events, the cotton will be caused to maintain constant agitation, so that, in such disturbing action, the saw will pick the cotton and carry same to the restricted opening 41, through same and past the kicker roller, which roller will act on any clinging hulls, kicking same with a force sufficient to drive said hulls from the cotton against the lint belt, whereupon, the action above described is repeated until said hulls will no longer adhere to the said lint belt, but slides from same to the restricted opening 42, where, if any lint still adheres to the hull, the teeth of the picker saws will pick same, thereupon, the above operation will be repeated and continued until the hull passes through the restricted opening 42, and into the hull conveying chamber 43, where said hulls are removed from said chamber by means of the rotary conveyer 44 secured to the shaft 45, and out of the machine through the spout 46, which spout is adapted to receive the end of a suction pipe, by means of which said hulls are carried out of the gin house.

It is now obvious that in the operation of the lint belt 17, all of the cotton lint will eventually find its way into contact with said lint belt, and into contact with the lint brush 35 and eventually picked by the saws 37. Also, that in the operation of the said lint brush, cotton that would sometime come in contact with the upper portion of said brush, would be carried around with said lint brush in the space 47, Fig. 1, but, by virtue of the extended portion of the casing 48, the said cotton would be carried on and discharged at or immediately after leaving the point of tangency of the lint brush with the lint belt. It is also apparent that said belt 17, when of fibrous construction, will stretch in service and to maintain a certain amount of tautness to said belt, I provide the means to adjust the center distance of the lint belt shafts 21 and 22, in the form of the set-screws 31 and the checknuts 32, impinging against the lug 33.

Other adjustment than that above referred to may be necessary, and for another purpose, as will presently appear.

In commercial machines I have obtained admirable results with a fixed opening 42, between the picker saws and the lint belt, Fig. 1, equal to one inch of measure. I have found however, that in the general run of cotton, cotton apparently that had been run through a gin, of a bolly nature and which had not been treated prior to ginning, was so torn up and impregnated with fractured hull segments, necessitated a smaller opening 42 than that ordinarily required for bolly cotton right from the fields, and which permits said opening to be fixed as above referred to. Therefore, to meet the condition of the cotton referred to as extraordinary, I have provided that the lower lint roll member 20, may be adjusted when said extraordinary condition is met, to adapt the machine to handle such material efficiently. For this purpose, the extension 30, of the bracket member 24, Figs. 2, 3, 4 and 5, may be placed so that the bolts 34 may engage either one of the threaded holes *a*, *b* or *c*, which provides three different positions for the lint belt 17 and the opening 42 between said belt and the picker saws 37. In the commercial practice referred to, I have found that three different sized openings 42 are ample, the maximum, as at hole *a*, to equal substantially one inch of measure; the hole *b*, substantially three-quarters of an inch of measure; and, the hole *c*, one-half inch of measure, which latter, is the minimum measure of the opening 42 found necessary from the practice referred to. The relative positions assumed by the parts so adjusted, are illustrated in the drawings: The position when the bolt 34 is engaging the hole *a*, is shown in Fig. 1; when in hole *b*, Fig. 4; and, when in hole *c*, Fig. 5. The original position of the parts, as shown in Fig. 1, are also shown by dotted lines in Figs. 4 and 5.

During the action of separating the boll cotton from the boll segments, it is obvious that a cleaning action has also taken place, and that together with the hulls, dirt and other trash will fall into the conveying chamber 43 and be removed therefrom as previously described.

The picker teeth of the saws 37, carry the cotton through the restricted space 41, previously described, and on past the open space 49, where, due to the centrifugal forces set up by the rotating saw cylinder, will cause to be thrown off all stems and other heavy particles, loosely carried by said cotton, into the trash chamber 10, to be removed from same by means of the conveyer previously described. The cotton however, which is gripped by the inclined teeth of the picker saws, will be carried on and into contact with the doffer brush, indicated generally by the numeral 50, which is secured to and rotated by the shaft 51, which doffer brush, will remove the said cotton from the said picker teeth and deliver same to the chute 52, through same to the breast of a gin for the usual purpose of ginning.

Figure 3:
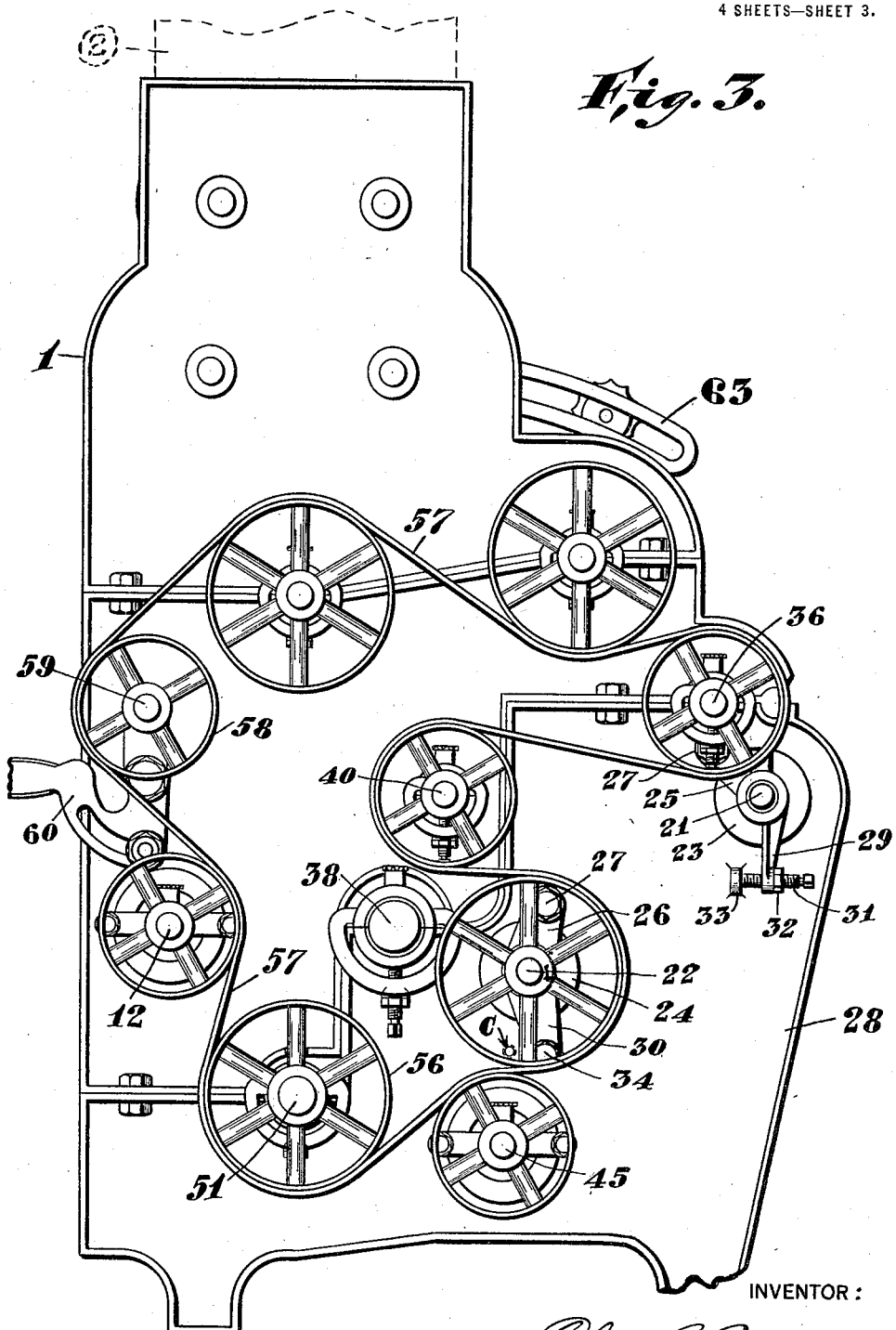
Fig. 3 is an end elevation of the left side of the machine.
Figure 4:
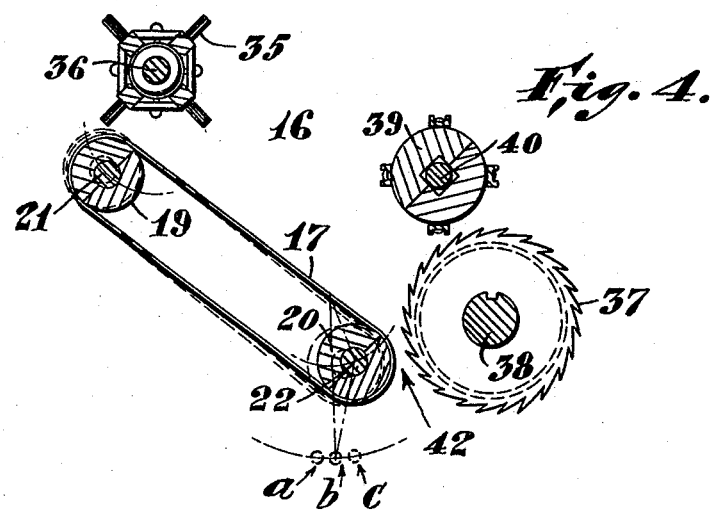
Fig. 4 is a schematic view of the means contained within the cotton separating chamber, certain parts of which are in different position to that shown in the separating chamber of Fig. 1; and, Fig. 5 is similar to Fig. 4 except that the certain parts are shown as adjusted to another position.
Figure 5:
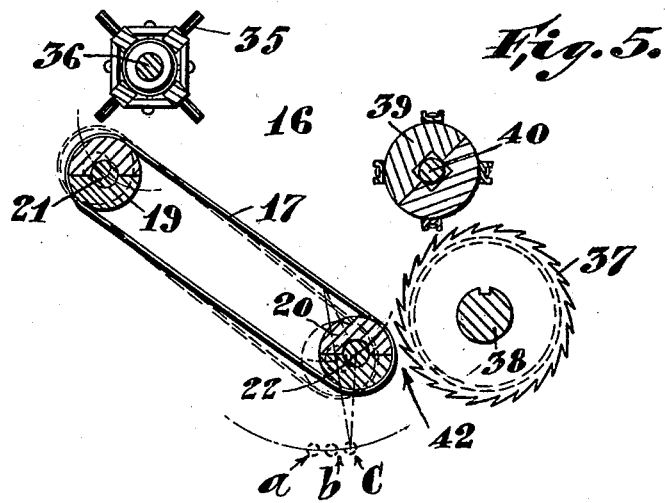

It is understood that all of the shafts and the parts secured thereto, Fig. 1, are adapted to rotate in the directions indicated by the respective arrows, the means for which are shown in Figs. 2 and 3, which comprise the pulley 53, secured to doffer brush shaft 51, and adapted to receive a belt (not shown) from any suitable source of power.

Secured to the shaft 51, is a pinion 54, adapted to engage and mesh with and rotate the gear 55, which gear is secured to the picker saw shaft 38 by any suitable means. Thus the doffer brush shaft 51 and the picker saw shaft 38, are adapted to rotate with positive translated motion, the brush substantially four times faster than the saw. To the other end of the doffer brush shaft 51 I provide and secure thereto, the pulley 56 adapted to engage the belt 57, which endless belt engages also and rotates the pulleys secured to the respective shafts, as illustrated in Fig. 3.

An idler pulley 58, journaled on the stub shaft 59 of the adjustable bracket 60, has been provided as the means to tighten said endless belt 57, as will be understood by those skilled in this art.

In the companion application previously referred to, means for operating the plural members was fully described, and as said members and means for operating same, form no part of the present invention herein described and claimed, it will suffice to say, therefore, that said members are given the different peripheral velocities, referred to previously, by means of the train of spur gears 61, having intermeshing engagement as shown, wherein the pawls 62 are journaled on extensions of the lever 63 and adapted to engage the teeth of and rotate the ratchet wheel 64, when said lever 63 is given an adjustable oscillating movement by means of the connecting-rod 65, one end of which has adjustable engagement with said lever and the other end of which rod has engagement with an eccentric secured to the picker saw shaft 38.

Having thus described my invention I claim:

1. In a cotton separator and cleaner, a reduction chamber and a separating chamber, means contained within said separating chamber to catch the cotton discharged from said reduction chamber and means to remove the cotton from said catching means, whereby said cotton will be caused to agitate freely within the said separating chamber.

2. In a cotton separator and cleaner, a reduction chamber and a separating chamber, means contained within said separating chamber to catch the cotton discharged from said reduction chamber, said means comprising a continuously moving belt and means to remove the cotton caught by said belt, whereby said cotton will be caused to agitate freely within the said separating chamber.

3. In a cotton separator and cleaner, a reduction chamber and a separating chamber, an endless belt within said separating chamber to catch the cotton discharged from said reduction chamber and a brush to remove said cotton from said belt so that the said cotton will be caused thereby to maintain constant agitation while within the said separating chamber.

4. In a cotton separator and cleaner, a separating chamber, picker saws partially entering said chamber, means within the said chamber to catch the cotton delivered to same, a brush to remove said cotton from said catching means and to impinge the said cotton against the picker saws.

5. In a cotton separator and cleaner, a separating chamber and means within said chamber to catch the cotton delivered to same, said means comprising an endless belt adapted to move continuously over rolls and in contact with a rotary lint brush at one side thereof.

6. In a cotton separator and cleaner, a separating chamber, picker saws partially entering said chamber, means within the said chamber to catch the cotton delivered to same, said means comprising an endless belt adapted to move continuously over rolls and in contact with a brush at one side thereof and adjacent the picker saws at the other side.

7. In a cotton separator and cleaner, a separating chamber, picker saws partially entering said chamber, means within the said chamber to catch the cotton delivered to same, said means having adjustable end members whereby the said means are maintained in operative relation with each other and in operative relation with respect to the picker saws.

8. In a cotton separator and cleaner, a separating chamber, picker saws partially entering said chamber and a lint brush wholly within the said chamber, means within said chamber to catch the cotton delivered to same, said means having adjustable end members whereby the said means are maintained in operative relation and in operative relation with respect to said picker saws and with said lint brush, whereby the cotton as delivered to the said separating chamber may be operated upon efficiently substantially as and for the purpose set forth.

9. In a cotton separator and cleaner, a separating chamber, picker saws partially entering said chamber, a continuously moving belt to catch the cotton delivered to said chamber; said belt being mounted on adjustable rolls one of which is adapted to move the said belt; a lint brush adapted to rotate and remove said cotton from the said belt and impinge the said cotton against the picker saws; a kicker cylinder adapted to kick off hull segments adhering to said picker saws; a supplemental chamber adapted to receive heavy particles of trash thrown off the said saws; and means to remove the cotton from the said picker saws and to discharge same through a chute substantially as and for the purpose set forth.

Signed this 9 day of August, 1918.

OLIVER G. SIMMONS.

Copies of this patent may be obtained for five cents each, by addressing the "Commissioner of Patents, Washington, D. C."